Jan. 16, 1951 J. P. CORCORAN ET AL 2,538,354

METHOD FOR DETECTING SOUND TRACK IMPERFECTIONS

Filed May 28, 1945

INVENTORS.
James P. Corcoran
John D. Stack

BY

Robt. L. Gunn

ATTORNEY

Patented Jan. 16, 1951 2,538,354

UNITED STATES PATENT OFFICE 2,538,354

METHOD FOR DETECTING SOUND TRACK IMPERFECTIONS

James Patrick Corcoran and John David Stack, Los Angeles, Calif., assignors to Twentieth Century-Fox Film Corporation, Los Angeles, Calif., a corporation of New York Application May 28, 1945, Serial No. 596,274

1 Claim. (Cl. 179—100.3)

This invention relates to the art of recording sound on film and deals particularly with a device for detecting imperfections in sound tracks.

In recording sound on film, it is known that in spite of all precautions, certain imperfections such as small specks and pin holes will occur in the sound track which reproduce as objectionable noises. In the motion picture industry particularly these noises have become known as "pops" and must be eliminated to produce the quality of sound required in this art. As a result, the common practice has been to scan the sound track by eye to discover such imperfections. But this practice has proved to be slow, tedious, and far from being perfect, in that a great many imperfections that will make objectionable noises are so small that they are not detectable by the eye.

To overcome the above difficulties, we conceived of a method and means for electrically discovering and locating sound track imperfections. The method consists essentially in scanning a sound track in such a manner that the signal output of the track is partially canceled and thereby reduced while the imperfections such as specks, pin holes, etc., reproduce their full sound value. The over-all result is a reduction in the signal which proportionally raises the noise output of the imperfections in the track. The means for practicing the method consists mainly of an ordinary sound head and amplifier such as is used in reproducing sound. But instead of scanning the track parallel to the striations of the track in the usual manner, we turn the scanning slit at an angle to the striations so that at any instant of time the scanning slit diagonally crosses a plurality of striations, thereby transmitting an average of the rarefactions and condensations on the track. The scanning slit is of the usual width, which means that any imperfections such as a pin hole or a speck which constitute most of the imperfections in sound tracks will render their full noise value in passing through the slit. By this means we are enabled to reduce the sound signal on the track, which is equivalent to raising the intensity of the imperfection noises. Such a method and means will find a wide field of usefulness in sound recording on film and has been successfully used in the motion picture art in detecting and locating imperfections in recordings of music and speech.

Other objects and advantages will become apparent as the description proceeds in conjunction with the drawings in which.

Figure 1:
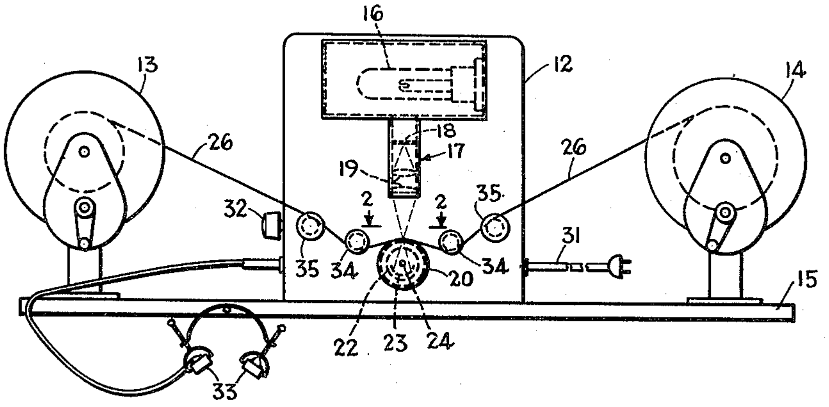
Figure 1 is a front view showing how the invention would be used in practical operation.

Referring to the drawing for a more detailed description of our invention, it will be seen in Figure 1 that our "pop" detector comprises, generally speaking, a case designated 12 and two reels 13 and 14. The reels 13 and 14 are of the conventional order and may be mounted upon any suitable support such as a table 15 which also carries the case 12.

Figure 2:
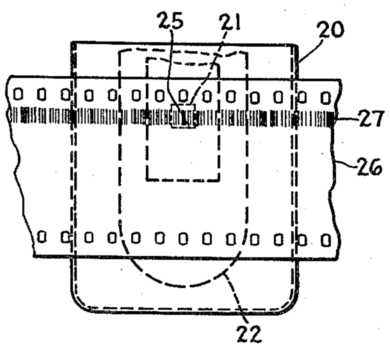
Figure 2 is a fragmentary view taken on line 2—2 of Figure 1.
Figure 3:
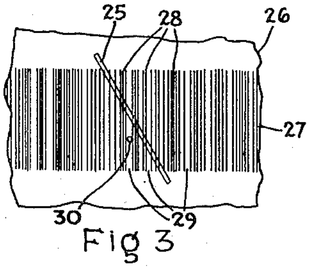
Figure 3 is an enlarged view showing the position of the scannning slit with respect to the sound track.

As shown on case 12, there is an ordinary exciter lamp 16 fed from a suitable source in any conventional manner. Associated with the exciter lamp 16 is an optical system generally designated 17 which comprises a mask 18 having a slit therein and a lens system 19. The lamp and the optical system just described project a line of light substantially one mil in width into a window 21 formed in a tubular projection 20 extending outwardly from the lower part of the case 12. Inside projection 20 is a photo-electric cell 22 comprising an anode 23 and a cathode 24 beneath the window 21. The optical system 17 and the light 16 previously described are arranged to project an image of the light slit 18 through the window 21 at an angle as shown by the line 25 in the Figures 2 and 3. In practice it has been found that an angle of around 30 degrees will yield the best results. However, there may be cases where a greater or lesser angle would be needed. For this reason we have made the optical system 17 rotatable with respect to the housing that surrounds the exciter lamp 16. This may be done in any suitable way, such as by friction mounts. From the foregoing it can be seen that if a film, such as shown at 26 having a sound track 27 thereon, is placed so that the sound track comes over the window 21, the light line 25 will scan the sound track at an angle in such a manner that the condensations and rarefactions of the sound track will be averaged; that is, there will be a partial cancellation of the light and the dark spaces in the track with a substantial reduction in the output signal. This is best shown in Figure 3, which shows a sound track 27 composed of condensations 28 and rarefactions 29. The image 25 of the light slit is shown scanning these elements at an angle, thereby giving an over-all result of cancellation between the dense and light areas. However, a small imperfection, such as shown at 30, when passing through the image 25 will give its true value of sound and will thus be more readily detected since it has been proportionally amplified by the reduction of the speech signal.

Figure 4:
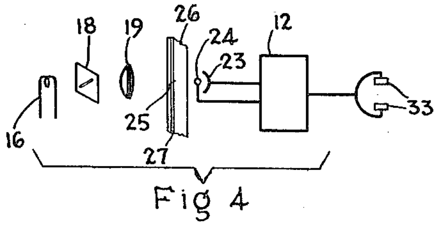
Figure 4 is a diagrammatic view showing the relation of the different parts of my invention as used in operation.

In Figure 4, we have shown a view of the elements of our invention arranged in the manner in which they operate. The same numbers are used here as are used in the other figures. The apparatus may be used to scan sound tracks embodying music, speech, or a combination of both and will not only detect small imperfections but will give the operator a check on the noise produced by splices, scratches, dirt, etc.

An operator may practice our invention and use our device by connecting the case 12 to any suitable electric source through the connector 31. This will energize an ordinary amplifier in the case 12 and will also energize the light 16. Provision is made for plugging in a head set 33 which the operator uses in detecting the imperfections. Detection of minute imperfections may be had by running the film 26 over the projection 20 in such a manner that the sound track 27 passes over the window 21. The operator will hear in the head phones a certain amount of reproduced sound. However, this amount will be materially reduced by the cancellation previously explained, with the result that the "pops" caused by the imperfections will be amplified to such an extent that the operator may readily detect them by ear. Then by moving the film backwards and forwards he can exactly locate each imperfection.

The invention has been described in connection with a variable density sound track but is not intended to be limited to such since a variable area track may be scanned by a diagonal slit in the same manner and comparable results obtained.

We claim:

In a sound reproducing system having a light slit and a variable density motion picture sound track, the method of detecting imperfections in said track which comprises the steps of setting the light slit at an angle to the striations in the track, scanning the track through said slit to reproduce imperfections and portions of a plurality of striations, producing an electrical output representative of the scanned striations and imperfections, and producing an audible response by said electrical output.

JAMES PATRICK CORCORAN.
JOHN DAVID STACK.

REFERENCES CITED

The following references are of record in the file of this patent:

UNITED STATES PATENTS

| Number | Name | Date |
|---|---|---|
| 1,759,580 | Kwartin | May 20, 1930 |
| 1,767,790 | Gerlach | June 24, 1930 |
| 2,180,972 | Wohlrab | Nov. 21, 1939 |
| 2,244,228 | Weitmann | June 3, 1941 |
| 2,337,974 | Collins | Dec. 28, 1943 |